United States Patent
Zhao et al.

(10) Patent No.: US 7,506,144 B2
(45) Date of Patent: Mar. 17, 2009

(54) DYNAMIC PRE-OPERATING SYSTEM BILLBOARD SERVICE

(75) Inventors: Jerry Zhao, Shanghai (CN); Changpeng Chen, Shanghai (CN); Michael A Rothman, Puyallup, WA (US); Ruth Li, Shanghai (CN); Xiaojian Wu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 428 days.

(21) Appl. No.: 11/284,522

(22) Filed: Nov. 21, 2005

(65) Prior Publication Data

US 2007/0118728 A1 May 24, 2007

(51) Int. Cl.
*G06F 9/00* (2006.01)
*G06F 3/00* (2006.01)
(52) U.S. Cl. .................. 713/1; 713/2; 715/738
(58) Field of Classification Search .......... 713/1, 713/2
See application file for complete search history.

(56) References Cited

U.S. PATENT DOCUMENTS 6,564,318 B1    5/2003  Charda et al.

2002/0019901 A1    2/2002  Shin
2003/0122864 A1    7/2003  Jenne et al.
2005/0021393 A1    1/2005  Bao et al.
2007/0022282 A1*   1/2007  Chang .................... 713/2

FOREIGN PATENT DOCUMENTS

JP    2004021781 A  *  1/2004

OTHER PUBLICATIONS

International Search Report and Written Opinion of International Patent Application Serial No. PCT/US2006/044125 filed May 31, 2007, Mailed Feb. 13, 2008, 8 pgs.

* cited by examiner

*Primary Examiner*—Suresh K Suryawanshi
(74) *Attorney, Agent, or Firm*—Caroline M Fleming

(57) ABSTRACT

A method and apparatus for retrieving dynamic content over a communications network prior to booting an operating system is presented. The content may include a screen image for display on a console. The time period for displaying the content may be controlled by another computer coupled to the communications network. The content may be an advertisement that is displayed on a computer system in an Internet café for a controllable period of time prior to booting an operating system.

20 Claims, 8 Drawing Sheets

DYNAMIC PRE-OPERATING SYSTEM BILLBOARD SERVICE

FIELD OF THE INVENTION

This disclosure relates to display of dynamic content in a pre-boot environment.

BACKGROUND

Internet cafés that provide public access to the Internet are popular, especially in Asian countries, with thousands of Internet cafés providing access to the Internet through millions of computers. For example, China has more than 130,000 Internet cafes with over 6 million computers. Typically, the customers of Internet cafés cannot afford a personal computer. The customer pays a fee to use a computer in the Internet café.

To defray the cost of purchasing the computers to provide access to the Internet and thus reduce the fee paid by customers, the owners of Internet cafés typically provide fee-based advertising services. These advertisements are delivered through the use of pop-ups during run-time while the customer is accessing the Internet. However, the advertisements use run-time resources and are annoying to customers because they interrupt the customer's use of the Internet and they continue to be displayed until they are terminated by the user.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

According to an embodiment of the invention, dynamic content such as a screen image may be retrieved over a communication network and displayed for a selectable time period prior to booting the operating system. In an embodiment the screen image is an advertisement that is displayed on a client system in an Internet café. By displaying the advertisement prior to booting the operating system, the advertising time period is limited so that it does not annoy the user. Also, the advertisement is displayed prior to run-time while the user cannot use the computer system. Furthermore, the user does not have to terminate the advertisement because it is automatically terminated after the selected time period by the process of booting the operating system.

Figure 1:
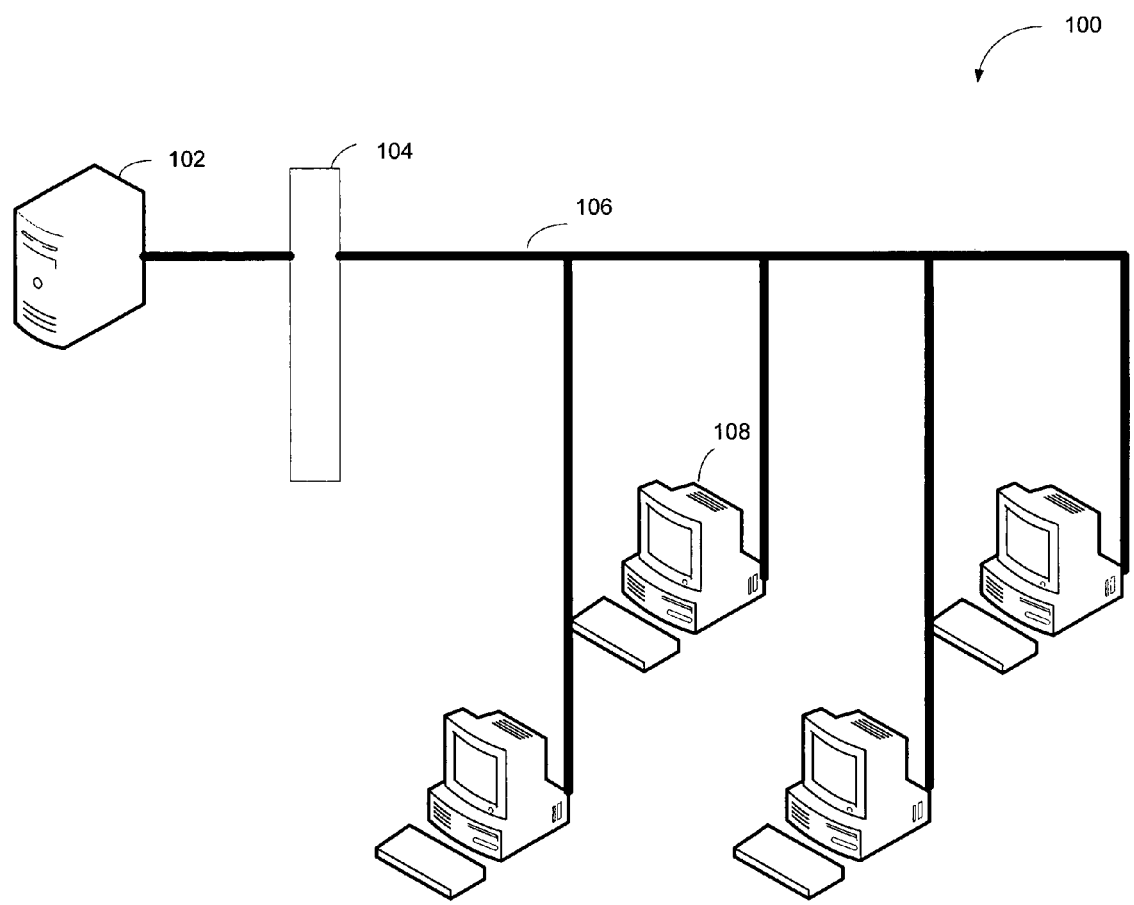
FIG. 1 is a block diagram illustrating an embodiment of an Internet café system having a plurality of client systems which display dynamic content in a pre-boot environment according to the principles of the present invention.

FIG. 1 is a block diagram illustrating an embodiment of an Internet café system 100 having a plurality of client systems 102 which display dynamic content in a pre-boot environment according to the principles of the present invention. The client system includes a server 102 coupled to a switch/router/hub 104 which provides access to a communications network 106 which may be a Local Area Network (LAN). The server 102 may set up an initialization path and remotely power on/shut down and restart all client systems 108 coupled to the communications network 106.

In an embodiment, each client system 108 has firmware stored in non-volatile memory and one or more operating systems stored in a secondary storage device such as a disk drive. The firmware performs initialization functions to allow the client system 108 to access the communications network 106. After a client system 108 has booted an operating system, the server 102 may download applications to client systems over the communications network.

Figure 2:
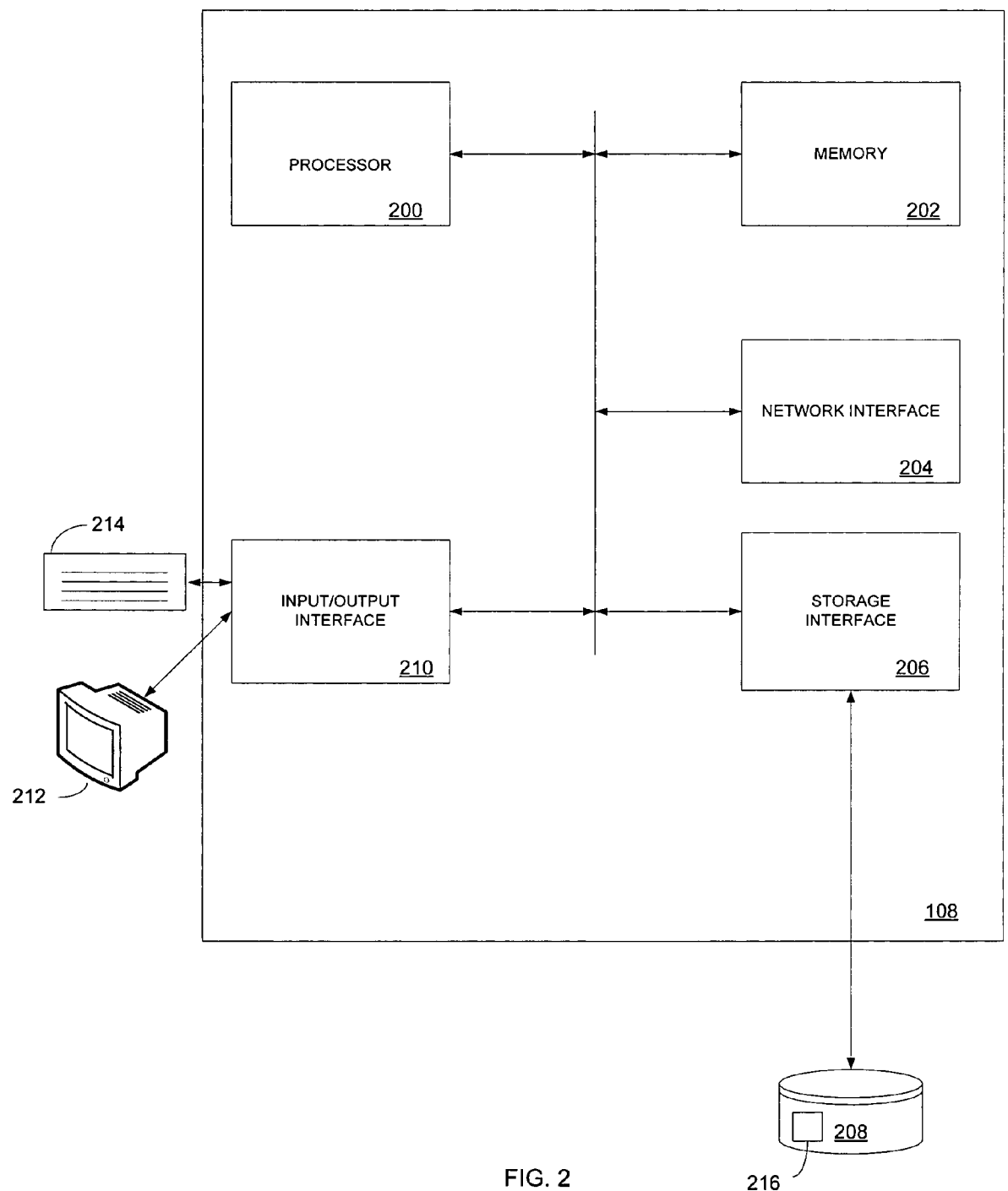
FIG. 2 is a block diagram of an embodiment of any one of the client systems shown in FIG. 1.

FIG. 2 is a block diagram of an embodiment of any one of the client systems 108 shown in FIG. 1. In the embodiment shown, the client system 108 includes a processor (Central Processing Unit (CPU)) 200, memory 202, a network interface 204, a storage interface 206 and a storage device 208. The client system 108 also includes an input/output interface 210 that provides an interface to an output device such as a display 212 and input devices such as a keyboard 214. An operating system 216 may be stored in the storage device 208.

Figure 3:
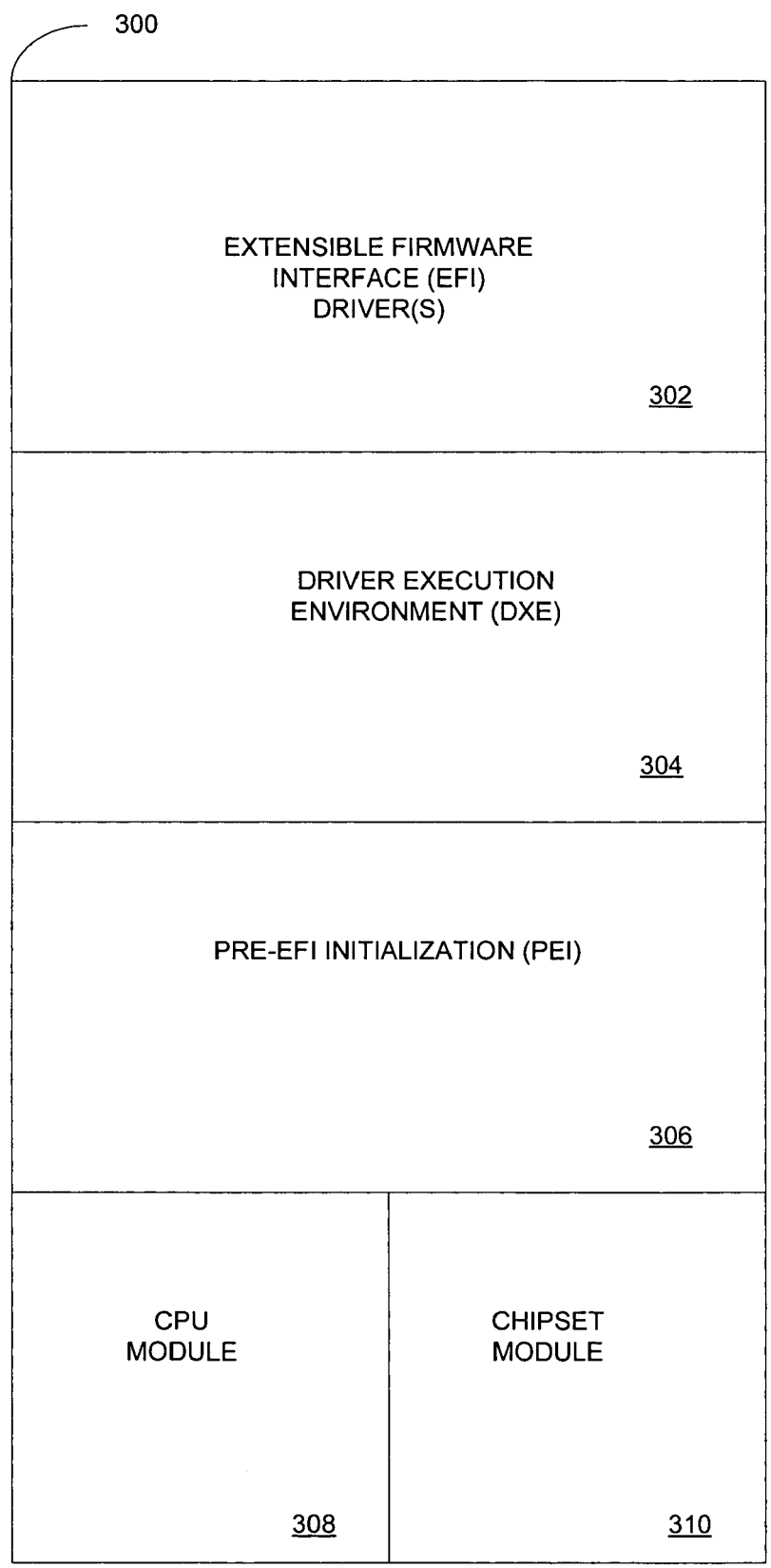
FIG. 3 is a block diagram of an implementation (framework) of an Extensible Firmware Interface (EFI) that may be included in any one of the client systems shown in FIG. 1.

FIG. 3 is a block diagram of an implementation (framework) of an Extensible Firmware Interface (EFI) 300 that may be included in any one of the client systems 108 shown in FIG. 1. EFI is a publicly available specification that defines the interface between firmware and an operating system. The interface includes data tables that store hardware related information and boot and runtime service calls that are available to the operating system and the operating system loader. In addition to providing boot and runtime services, the framework provides ordered load and execution of EFI drivers.

A version of EFI is described in "Extensible Firmware Interface Specification", Version. 1.10, Dec. 1, 2002 available at www.intel.com/technology/efi. The hardware layer is the lowest layer of the framework. In an embodiment, the hardware layer may include a CPU module 308 and a chipset module 310 that provide the functionality of the client system 108 shown in FIG. 2.

Boot refers to the process of starting or resetting a computer by turning the power on, by pressing a reset button on the computer, or by issuing a software command to restart. The computer executes the software that loads and starts the operating system and prepares the operating system for use.

The EFI framework includes two main parts, the Pre-EFI (PEI) phase 306 and the Driver Execution Environment (DXE) phase 304, that operate sequentially. The Pre-EFI (PEI) phase discovers and initializes memory. The Driver Execution Environment (DXE) initializes other components in the client system and provides support for EFI drivers 302. Together, the PEI phase 306, the DXE phase 304 and the EFI drivers 302 provide a standard environment for booting an operating system and running pre-boot applications. Code executed during the PEI phase 306 and DXE phase 304 may be stored in nonvolatile memory along with drivers to access storage devices that store EFI drivers 302.

An EFI driver 302 is a modular piece of code that runs during the DXE phase. EFI drivers may manage devices in the client system 108 or provide services for the pre-boot environment. The EFI drivers are single-threaded and provide basic support for a console and network support for the pre-boot environment, that is, support to boot the operating system and manage the client system 108 in the pre-boot environment. The minimum support includes support for a control unit, such as a terminal (console), through which a user communicates with a computer. The console includes an input device such as a keyboard and an output device such as a display. The console may provide Cathode Ray Tube (CRT)-terminal like text support or graphics support on a Video Graphics Array (VGA) or Universal Graphics Adapter (UGA) device. Other EFI drivers for security, wireless and audio drivers may also be provided.

Figure 4:
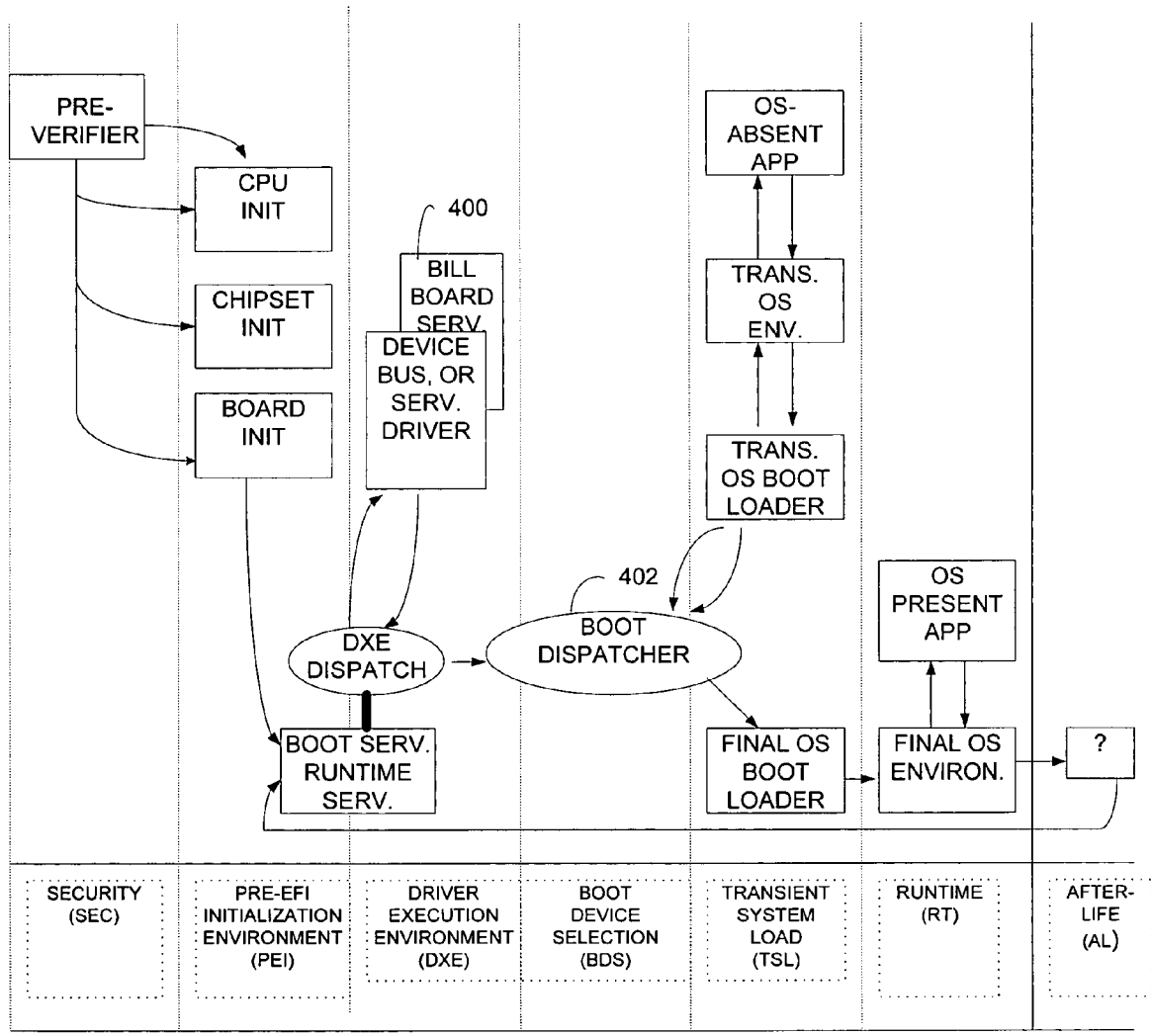
FIG. 4 is a timeline illustrating the phases that a system with framework-based firmware goes through on power on or reboot.
Figure 5A:
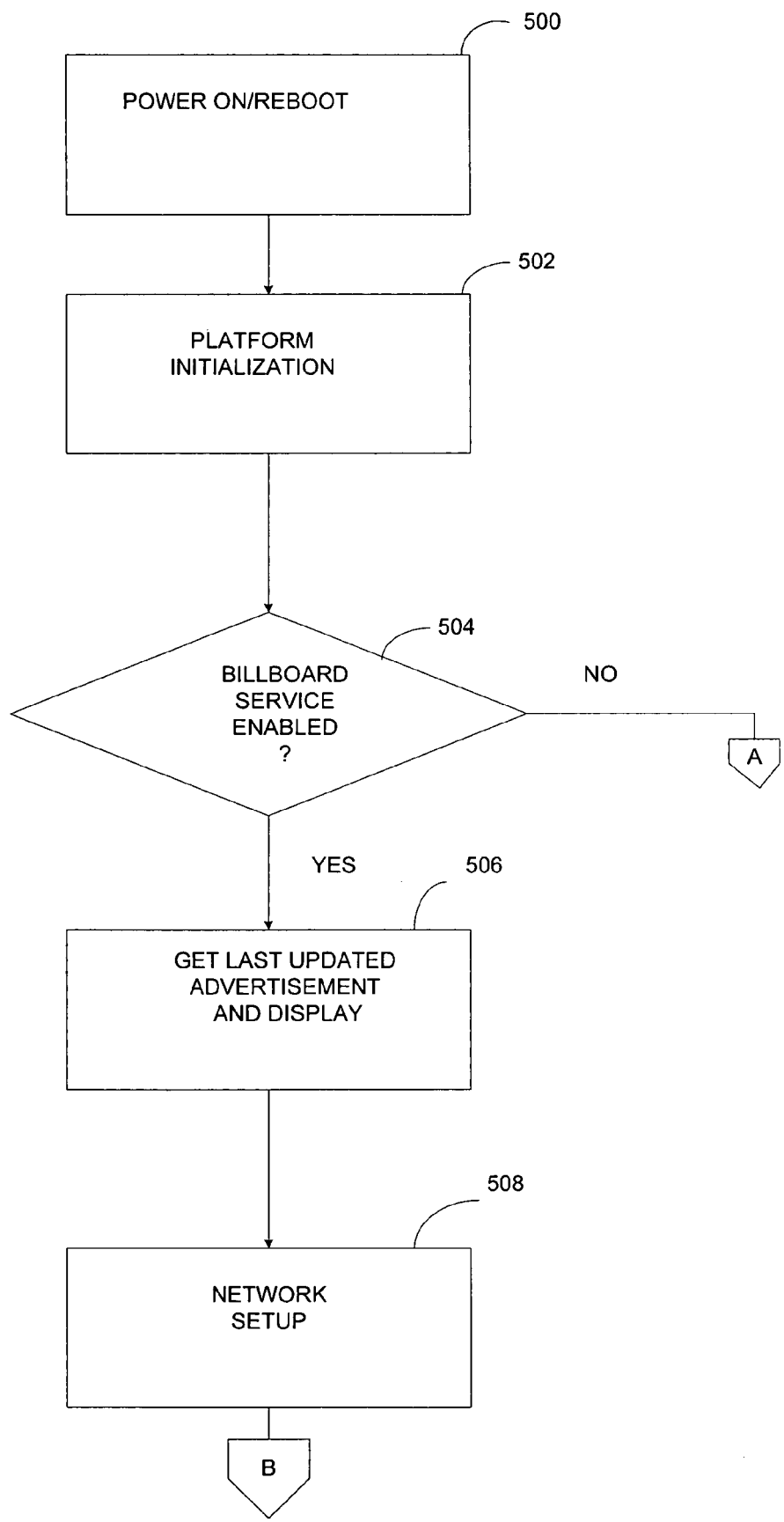
FIGS. 5A-5D is a flowchart illustrating the operation of an embodiment of a billboard service for displaying dynamic content for an advertisement that may be downloaded from a server to a client system prior to booting the client system's operating system.
Figure 5B:
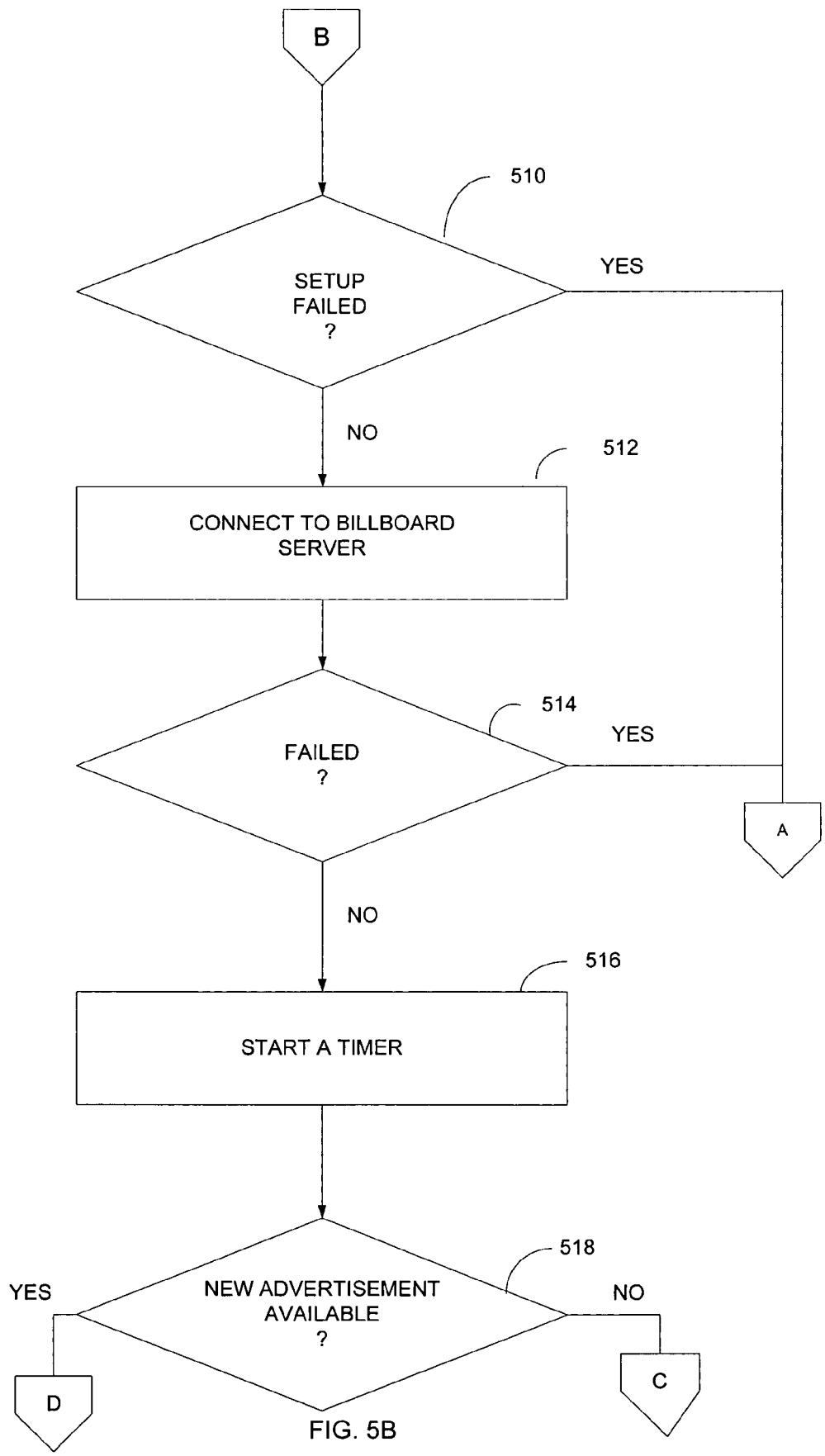
Figure 5C:
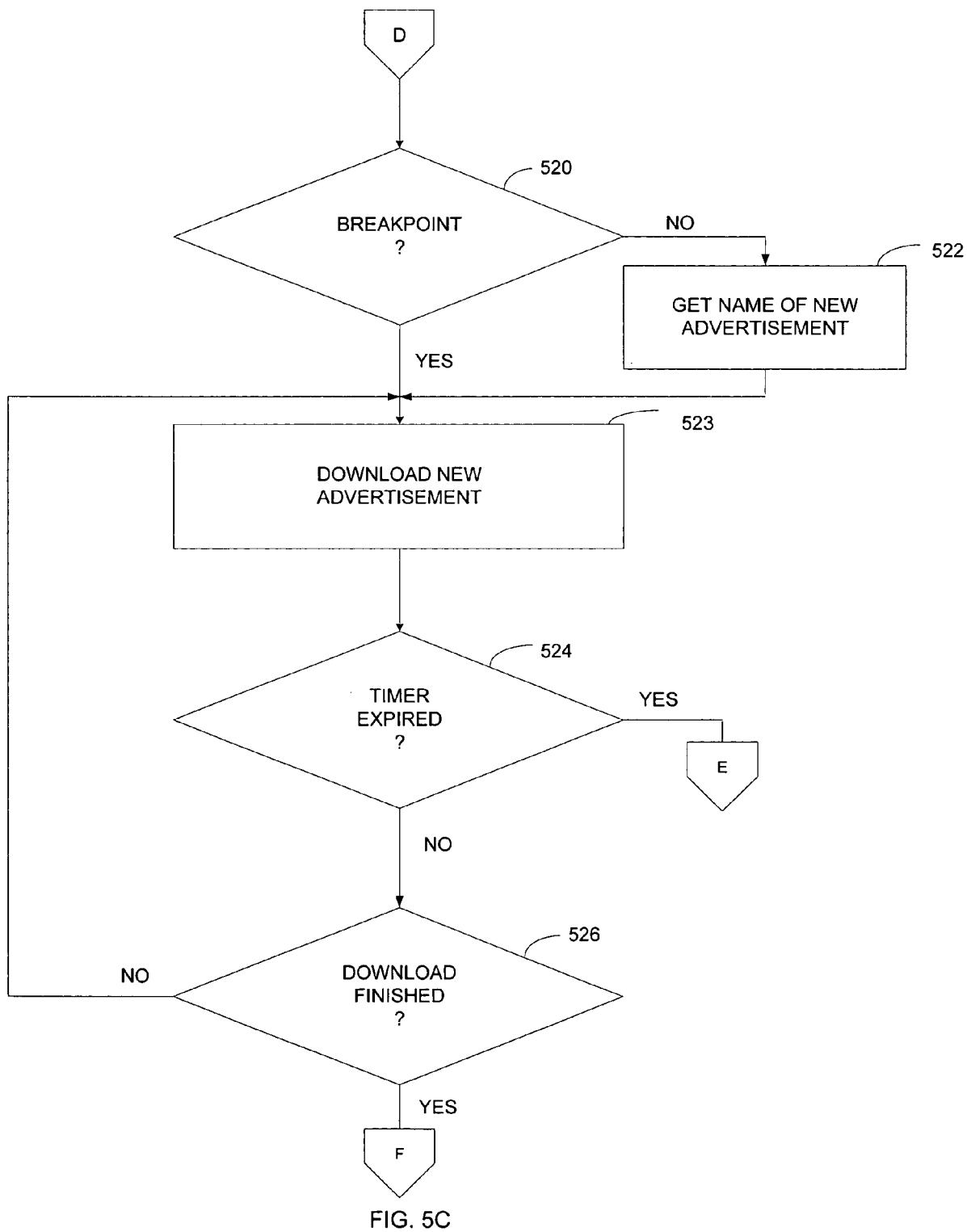
Figure 5D:
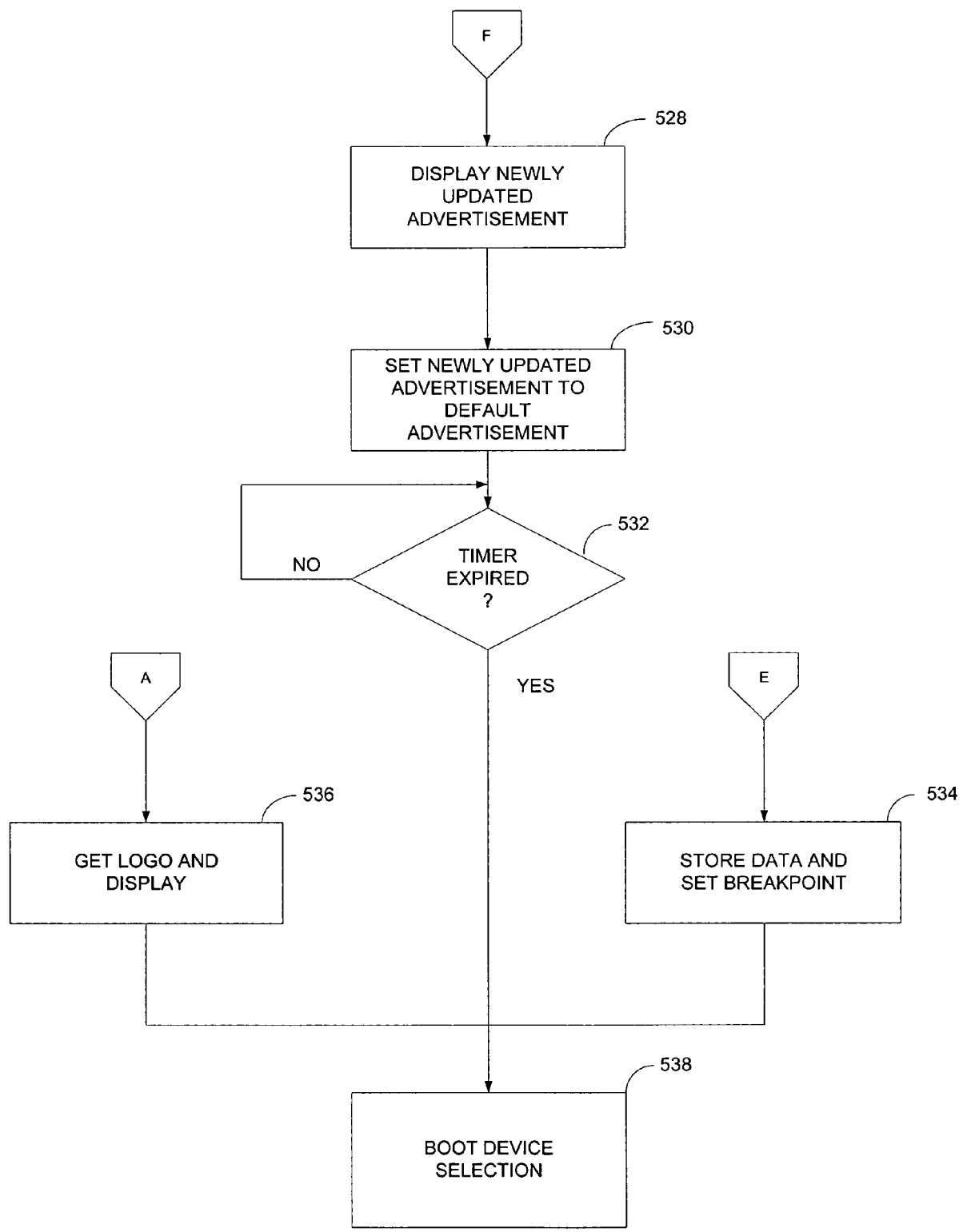

FIG. 4 is a timeline illustrating the phases that a client system with framework-based firmware goes through on power on or reboot. For a reboot, the operating system is reloaded without necessarily power cycling the client system.

During the security (SEC) phase which begins with power on, the first opcode that will be executed in the client system is inspected to determine if the firmware has been tampered with.

During the pre-EFI initialization environment (PEI) phase, memory in the platform is discovered and a resource map is prepared for the DXE phase.

During the driver execution environment (DXE) phase, the boot manger and EFI drivers are loaded. The DXE phase provides a set of boot services, runtime services and DXE services. The DXE dispatcher is responsible for discovering and executing DXE drivers and EFI drivers. These drivers may be executed in a predefined order. The EFI drivers may comply with the EFI Version 1.10 driver model available at www.intel.com/technology/efi. The boot manager determines what operating system is to be loaded and the required boot devices. All of the EFI drivers may be loaded or just those that are needed for the boot operation. Boot services provide interfaces for devices and system functionality that can be used during boot time.

After the EFI drivers for the network, console and a billboard service driver 400 have been initialized, the client system 108 is ready to receive content sent from the server 102 over the communications network 106 and to display this content on the display of the console. The content to be displayed may be include text, graphics and video, that is, any content that is typically provided through a world wide web (www) page accessible over the Internet. In an embodiment, in addition to content to be displayed, the downloaded content may also include audio that includes speech and music. The receipt of the content to be displayed and the display of the received content for a controllable time period may be handled by the billboard service driver 400 which will be described in greater detail later in conjunction with FIG. 5.

After the time period for displaying the screen image on the display has expired, a boot dispatcher 402 selects an operating system to boot during the boot device selection phase (BDS). The BDS phase locates and loads applications that execute in the pre-boot environment. For example, the applications may include an operating system boot loader or extended pre-boot services such as setup configuration, extended diagnostics, flash update support and operating system boot code.

At the start of this phase, the operating system takes control of the display on the console device and typically blanks the display by resetting a display buffer storing the screen image.

The Transient System Load (TSL) phase allows service interfaces to be available to operating system loaders before the platform is taken over by the operating system kernel. During the transient system load (TSL) phase, the operating system is booted by the operating system boot loader.

The Runtime (RT) phase provides a means to have EFI drivers present during operating system execution to support the operating system. During run-time, the final operating system environment is running and applications can be executed. The client system remains in the runtime phase until a shutdown is detected.

The AfterLife (AL) phase, that is, post operating system, allows firmware to execute after the operating system is terminated (voluntarily or involuntarily).

FIGS. 5A-5D is a flowchart illustrating the operation of an embodiment of a billboard service for displaying dynamic content for advertisements that may be downloaded from a server 102 to a client system 108 prior to booting the client system's operating system. In one embodiment, the billboard service may be provided by a billboard service driver 400 during the DXE phase. The content or partial content to be displayed on the display of the console may have been downloaded in a prior pre-boot phase and be stored in non-volatile memory, partial content may be stored in non-volatile memory or new content may be downloaded during the current pre-boot phase.

At block 500, the client system 108 is powered on or rebooted. In an Internet café environment, a client system is rebooted on a regular basis prior to giving a user access to the client system. A reboot or "power on" command can be sent remotely from the server 102 to the client system 108. By cycling power or rebooting the client system 108, any data stored in volatile memory in the client system by the previous user may be erased prior to giving access to the client system to the next user.

At block 502, the hardware (platform) in the client system 108 is initialized during the PEI phase and DXE phase as discussed in conjunction with the timeline shown in FIG. 4. During initialization diagnostic tests are performed on the hardware (platform) to determine if it is operational and firmware drivers for input/output devices such as network devices and consoles are initialized. After the platform has been initialized, processing continues with block 504.

At block 504, a setup or configuration parameter is checked to determine if billboard service has been enabled. Enabling or disabling billboard service may be customized by end-users, for example, the owner of the Internet café. The configuration parameter may be stored in non-volatile memory such as flash memory in the client system 108. A configuration utility may be used to modify the configuration parameter to enable billboard service. If billboard service is enabled, processing continues with block 506. If not, processing continues with block 536.

At block 506, the last updated advertisement to be displayed by the console is obtained and displayed. If this is the first time that the platform has been initialized, the default logo stored in the client system 108 will be displayed. If an advertisement has previously been downloaded, it may be stored in non-volatile memory or on a storage device in the client system 108. In this case, the previously downloaded and stored advertisement is displayed on the console. Storing the previously downloaded advertisement for display during the pre-boot period ensures efficient use of the pre-boot advertisement period. This advertisement may be displayed while a new advertisement is downloaded from the server. Processing continues with block 508.

At block 508, the network interface is setup to allow content to be displayed on the client system to be downloaded from the server over the communications network. The related DXE network drivers are loaded into memory. In an embodiment that uses the Transmission Control Protocol/Internet Protocol (TCP/IP), the network stack is set up. Processing continues with block 510.

At block 510, if the network setup fails, processing continues with block 536 to display a logo stored in the client system and boot the operating system. If not, processing continues with block 512 to connect to the server over the communications network.

At block 512, the client system 108 connects to the server 102 over the communications network 106 to obtain content to be displayed prior to booting the operating system. Methods for connecting to a server over the communications network are well-known to those skilled in the art.

At block 514, if the connection to the communications network fails, processing continues with block 536, otherwise processing continues with block 516.

At block 516, a timer is initialized with a default value for a time period for displaying content received from the server over the communications network prior to booting the operating system. This default value is controllable and may be modified by the end user of the client system through the use of a configuration utility.

At block 518, the billboard service checks to see if there is new content available to be displayed. Advertisements are stored in a database in the server and downloaded to a client system during the pre-boot advertising phase which is part of the DXE phase. In one embodiment, the advertisement is a screen image that is stored in the server. If there is a new advertisement to be downloaded to this client system, processing continues with block 520 to download the new advertisement for display on the console of the client system during the pre-boot advertising phase. If not, processing continues with block 534.

At block 520, the billboard service determines if there is a breakpoint that was stored during a prior download of an advertisement indicating that the prior download did not complete. If the download of the advertisement cannot be completed due to expiration of the time period for displaying advertisements prior to booting the operating system, a breakpoint is set and stored in the client system. The breakpoint indicates the data offset within the advertisement file at which the download should start during the next pre-boot phase. The breakpoint stores the data offset point at which the first data transmission stopped and the next data transmission starts from this recorded point. For example, if the advertisement is stored in a file having a total size of 1024 octets, but the first data transmission only downloads 500 octets, the breakpoint 500 is recorded for this file. When the next download begins, the next request to download the file starts from the next octet at offset 501 within the file.

The next time that the client system is booted, the download of the content to be displayed on the console continues from the breakpoint. This increases the time that the advertisement is displayed on the console by reducing the download time. The previously downloaded portion of the advertisement is retrieved from non-volatile memory for display on the console together with the currently downloaded portion of the advertisement. This reduces the download time for this advertisement during the current boot phase. If there is a breakpoint that was set during a prior download that did not complete, processing continues with block 523. If not, processing continues with block 522.

At block 522, the name associated with the advertisement to be displayed is obtained. Processing continues with block 523.

At block 523, the advertisement to be displayed is downloaded from the server over the communications network. Processing continues with block 524.

At block 524, the timer is checked to determine if the time period to display content has expired. If so, processing continues with block 528. If not, processing continues with block 526.

At block 526, the download process is checked to determine if the download of the new advertisement to be displayed has completed. If so, processing continues with block 528 to display the new advertisement. If not, processing continues with block 523 to continue to download the new advertisement to be displayed.

At block 528, the new advertisement is displayed on the console. Processing continues with block 530.

At block 530, the new advertisement is set to the default advertisement to be displayed during the next pre-boot phase. Processing continues with block 532.

At block 532, the downloaded content is displayed until the time period expires. Upon detecting that the time period has expired, processing continues with block 538 to boot an operating system.

At block 534, the timer has expired and the advertisement that has been downloaded is stored in the client system. The advertisement is stored in non-volatile memory or a storage device. A breakpoint is set so that the download of the contents can resume at this point during the next reboot or "power on" cycle. Processing continues with block 538 to start to boot the operating system.

At block 536, the billboard service is not enabled for the client system, static contents stored in non-volatile memory in the client system may be displayed on the console prior to starting to boot the operating system. The static contents may be a particular logo, that is, a name, symbol, or trademark designed for easy and definite recognition. The static contents may be displayed while the hardware is initialized prior to starting the boot process at block 538.

At block 538, the operating system boot process begins. This may begin by selecting a device from which to boot the operating system. After control is transferred to the operating system boot process, the display contents are no longer under control of the billboard service.

In order to be compliant with a particular operating system, for example, to receive certification for the Microsoft windows operating system, a client system must start the boot of the operating system within a specified amount of time. The firmware in the computer must start launching the operating system within a prescribed period of time to pass hardware qualification testing in order to receive certification for the Microsoft windows operating system. However, this time restriction only applies prior to the purchase of the computer by the end-user. Subsequent to the sale, the owner of the computer may customize the pre-boot environment, for example, the owner may vary the pre-boot time to allow additional time for the display of dynamic content such as advertisements.

In an embodiment, the time period may be selectable by the owner of the Internet café. The time period may be selected through a setup option in a pre-operating system configuration utility. For example, the setup page may be part of a system configuration utility that may be invoked on a personal computer by selecting a particular function key on a keyboard.

In an embodiment, the selected time period to display the downloaded advertisement is 10 seconds. During the 10 seconds, the advertisement attracts the user's attention but does not annoy the user because it does not occur during run-time. As this time period is configurable per user, this time period may be shorter or longer than 10 seconds. For example, the time period may be 10 seconds for normal users and shorter for a different category of user.

The display of advertisements is operating system independent because it is performed prior to the boot of the operating system. Also, because the advertisement is displayed during the system initialization time it does not consume runtime resources.

The advertisements that are displayed prior to booting the operating system may be tailored to the particular user who is currently accessing the client system. For example, prior to providing access to the client system, the Internet café operator can register each user with demographic information such as age, job title, or college major so that the advertisements that are displayed are targeted to that type of user.

An embodiment of the invention has been described for the EFI interface which includes network capability allowing the dynamic content to be downloaded prior to booting the operating system. An embodiment of the invention may also be included in other systems that support dynamic download over a network prior to booting an operating system. For example, an embodiment may be included in a legacy BIOS system that provides network capability prior to booting the operating system.

An embodiment of the invention has been described for downloading advertisements for display prior to booting the operating system. Other embodiments of the invention may download other content to be displayed prior to booting the operating system. For example, in a non-Internet café environment, a corporate web page may be downloaded to every client system in a corporation or a home user may select a particular web page to be downloaded to the user's system each time the system is powered on or reset. The user can also select the time period for which the web page is displayed prior to starting to boot the operating system to give adequate time to read the contents.

The ability to display dynamic content prior to booting the operating system also allows Original Equipment Manufacturers (OEMs), that is, vendors who sell computers customized for a particular application and Independent BIOS Vendors (IBVs) to communicate with users.

It will be apparent to those of ordinary skill in the art that methods involved in embodiments of the present invention may be embodied in a computer program product that includes a computer usable medium. For example, such a computer usable medium may consist of a read only memory device, such as a CD ROM disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

What is claimed is:

1. An apparatus comprising:
   a billboard module to retrieve a screen image over a communications network prior to booting an operating system; and
   a display to display the retrieved screen image on a console prior to booting the operating system.

2. The apparatus of claim 1, wherein the screen image is displayed for a controllable time period.

3. The apparatus of claim 1, wherein the screen image is retrieved from a server coupled to the communications network.

4. The apparatus of claim 1, wherein the screen image to be retrieved is selectable by a service provider through a server coupled to the communications network.

5. The apparatus of claim 4, wherein the screen image is tailored to a user.

6. The apparatus of claim 1, wherein the screen image is selectable by a user.

7. The apparatus of claim 1, wherein the billboard module is part of an extensible firmware interface.

8. A method comprising:
   retrieving a screen image over a communications network prior to booting an operating system; and
   displaying the retrieved screen image on a console prior to booting the operating system.

9. The method of claim 8, wherein the screen image is displayed for a time period controlled by a system coupled to the communications network.

10. The method of claim 8, wherein the screen image to be retrieved is selectable by a service provider through a server coupled to the network.

11. The method of claim 10, wherein the screen image is tailored to a user.

12. The method of claim 8, wherein the screen image is displayed for a controllable time period.

13. An article including a computer usable medium having associated information,
   wherein the information, when accessed, results in a machine performing:
   retrieving a screen image over a communications network prior to booting an operating system; and
   displaying the screen image on a console prior to booting the operating system.

14. The article of claim 13, wherein the screen image is displayed for a controllable time period.

15. The article of claim 13, wherein the screen image to be retrieved is selectable by a service provider.

16. The article of claim 13, wherein the screen image is tailored to a user.

17. A system comprising:
   a disk drive capable of storing an operating system;
   a billboard module to retrieve a screen image over a communications network prior to booting an operating system; and
   a display to display the retrieved screen image on a console prior to booting the operating system.

18. The system of claim 17, wherein the screen image is displayed for a controllable time period.

19. The system of claim 17, wherein the screen image is tailored to a user.

20. The system of claim 17, wherein the screen image is retrieved from a server coupled to the communications network.

* * * * *